US009385831B2

(12) United States Patent
Marr et al.

(10) Patent No.: US 9,385,831 B2
(45) Date of Patent: Jul. 5, 2016

(54) CIRCUITS AND METHOD TO ENABLE EFFICIENT GENERATION OF DIRECT DIGITAL SYNTHESIZER BASED WAVEFORMS OF ARBITRARY BANDWIDTH

(71) Applicant: Raytheon Company, Waltham, MA (US)

(72) Inventors: Harry B. Marr, Manhattan Beach, CA (US); Daniel Thompson, Hermosa Beach, CA (US); Julia Karl, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 233 days.

(21) Appl. No.: 13/910,731

(22) Filed: Jun. 5, 2013

(65) Prior Publication Data

US 2014/0362774 A1 Dec. 11, 2014

(51) Int. Cl.
*H04K 3/00* (2006.01)
*G06F 1/02* (2006.01)

(52) U.S. Cl.
CPC ........ *H04K 3/42* (2013.01); *G06F 1/022* (2013.01); *H04K 3/00* (2013.01); *H04K 3/44* (2013.01)

(58) Field of Classification Search
CPC .................................. G06F 1/022; H04K 3/00
USPC ................................................. 708/270–271
See application file for complete search history.

(56) References Cited

U.S. PATENT DOCUMENTS

| 6,448,921 | B1 | 9/2002 | Tsui et al. | |
|---|---|---|---|---|
| 8,224,234 | B1 | 7/2012 | Schuster et al. | |
| 2001/0015644 | A1* | 8/2001 | Schwilch et al. | ............. 324/307 |
| 2004/0263378 | A1* | 12/2004 | Jossef | ..................... G01S 7/022 |
| | | | | 342/20 |
| 2009/0278994 | A1* | 11/2009 | Ibrahim | ........................ 348/729 |
| 2014/0225663 | A1* | 8/2014 | Seshita | ........................ 327/551 |

FOREIGN PATENT DOCUMENTS

| WO | WO-2014/197676 A2 | 12/2014 |
|---|---|---|
| WO | WO-2014197676 A3 | 12/2014 |

OTHER PUBLICATIONS

"International Application Serial No. PCT/US2014/041052, International Search Report mailed Feb. 10, 2015", 5 pgs.
"International Application Serial No. PCT/US2014/041052, Written Opinion mailed Feb. 10, 2015", 8 pgs.

* cited by examiner

*Primary Examiner* — Andrew Caldwell
*Assistant Examiner* — Calvin M Brien
(74) *Attorney, Agent, or Firm* — Schwegman Lundberg & Woessner, P.A.

(57) ABSTRACT

Embodiments of a system and method for providing efficient wideband inverse channelization for direct digital synthesizer based jamming techniques are generally described herein. In some embodiments, metadata associated with a technique for generating a waveform, such as frequency, phase and amplitude parameters, is received. Data select signals and data input are generated based on the received metadata. In-phase and quadrature signals are produced at an output of a first de-multiplexer and a second de-multiplexer, respectively, based on the data select signals and the data input. Frequency modulated signals generated by direct digital synthesizers may be combined in a channel using a separate, distinct channel combiner.

9 Claims, 8 Drawing Sheets

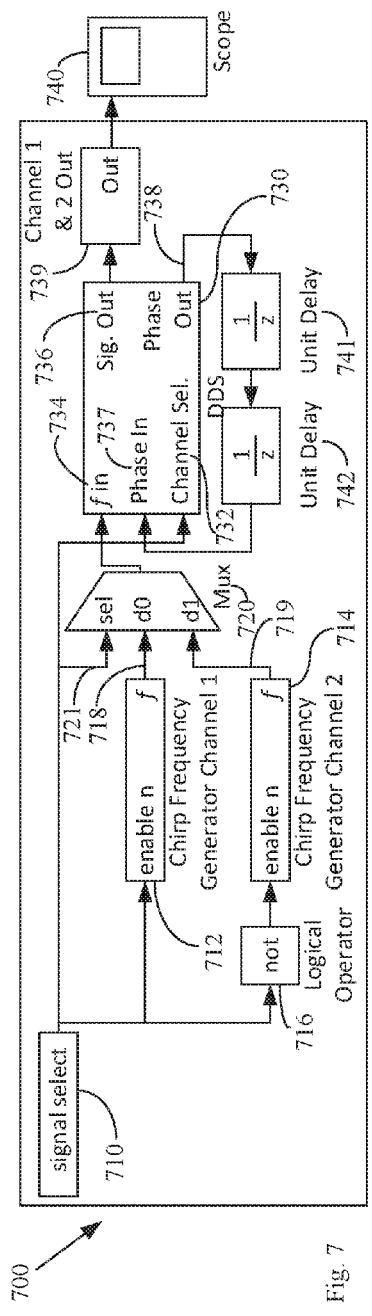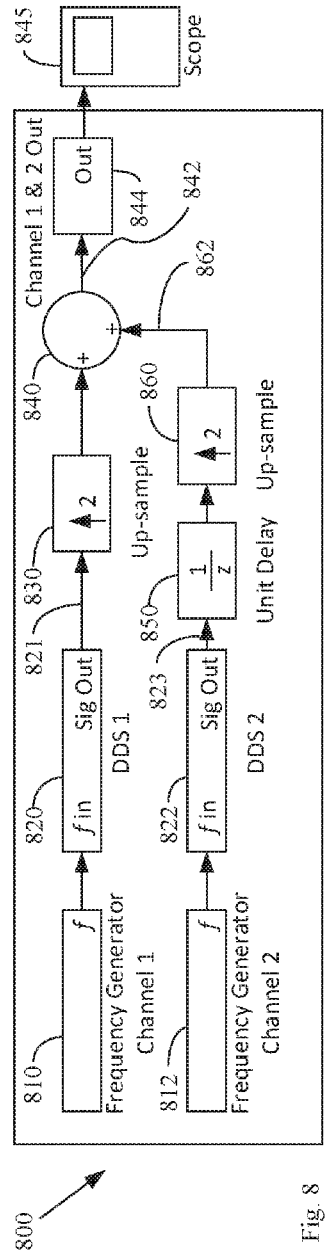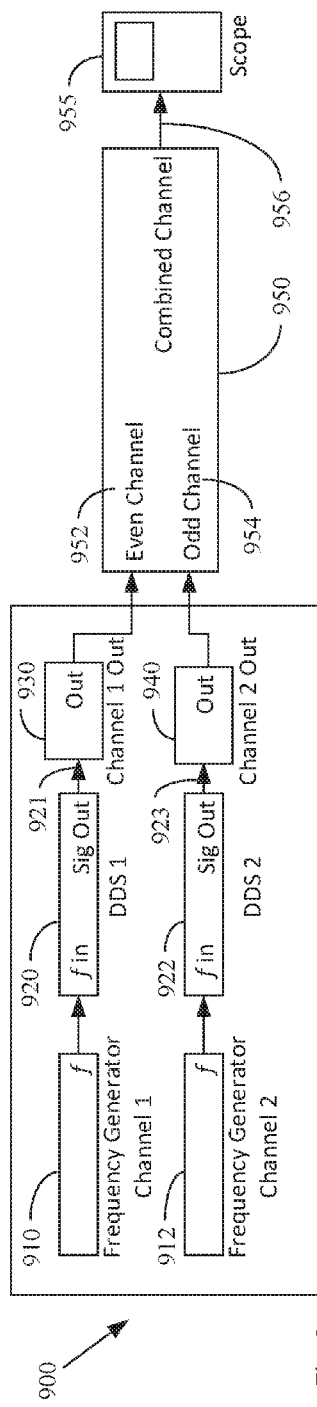

CIRCUITS AND METHOD TO ENABLE EFFICIENT GENERATION OF DIRECT DIGITAL SYNTHESIZER BASED WAVEFORMS OF ARBITRARY BANDWIDTH

BACKGROUND

Digital wideband architectures are a relatively recent invention and efficient digital delay synthesis circuits and architectures did not previously exist for wideband channelized architectures. Digital wideband architectures are useful for high speed digital communication technology. Herein, wideband may be used to refer to bandwidths from kilohertz (KHz) to multi-gigahertz (GHz) bandwidths. Channelized architectures become necessary when the bandwidth of the signals being considered are a multiple of the speed of digital logic. A direct digital synthesizer (DDS) is a type of frequency synthesizer used for creating arbitrary waveforms from a fixed-frequency reference clock. Thus, a direct-digital synthesizer (DDS) uses a digitally deterministic frequency synthesis technique, which is based on a digital definition of the result to generate a signal. A DDS uses logic and memory to digitally construct the output signal, and a data conversion device to convert it from the digital to the analog domain. Therefore, the DDS method of constructing a signal uses digital principles, and the precise amplitude, frequency, and phase may be known and controlled.

Previously analog voltage controlled oscillators were used to create waveforms, resulting in a limited frequency range. In digital architectures, the current practice involves direct digital synthesis (DDS) where multiple parallel DDS circuits create I/Q at very high rates directly for bandwidths at speeds that are multiples of the digital logic. In other methods, each technique, defined as a waveform with a specific instantiation of frequency, phase, and amplitude parameters as a function of time, had to be aware of the channelized structure explicitly switch channels in the architecture or have a specific parameter selecting a channel. Each technique typically had a DDS associated with it and raw I/Q data are passed around data lanes.

Channelized radio receivers divide an incoming radio frequency signal into plural frequency-segregated segments. Such receivers perform the channelizing function for a variety of reasons including the accomplishment of differing signal processing steps in the different channels, the physical separation of hardware relating to different channels, reduction of data rate per channel, and the preclusion of cross channel interference effects. However, a problem with channelization is that typically a frequency and a channel must be calculated and specified for each signal, which adds complexity, particularly when summing signals together.

Many attempts have been made at the wideband receive side of channelized architectures. There have also been architectures for the transmit side of narrow band radio waveforms, such as for communications. However, very little work has been shown for wideband channelized transmit architectures.

BRIEF DESCRIPTION OF THE DRAWINGS

FIG. 7 illustrates a circuit that allows only half of the channels used to be instantiated in hardware for a given clock cycle, effectively allowing channel resources to be shared.

FIG. 8 illustrates a modified infrastructure for sharing channel resources;

FIG. 9 illustrates another modified infrastructure that used a channel combiner according to an embodiment.

DETAILED DESCRIPTION

Figure 1:
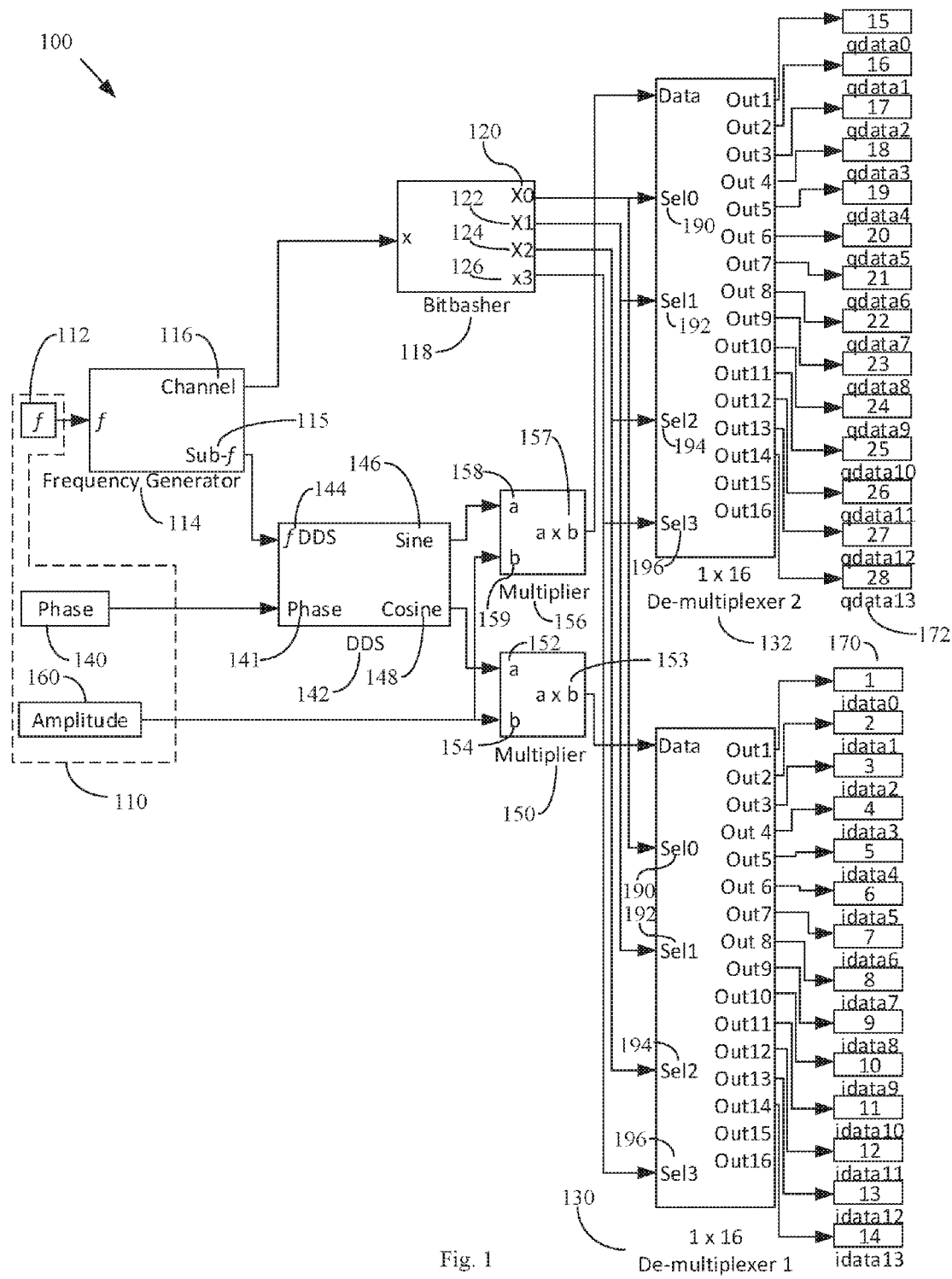
FIG. 1 illustrates a block diagram of a wideband inverse channelization device to transmit data according to an embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Each waveform generating technique creates a frequency list as a function of time. For a subset of waveform generating techniques, a phase list and amplitude list may also need to be constructed. Any possible waveform or combination of waveforms can be constructed with these three lists according to an embodiment. The technique does not need to be aware or make use of any channelized architecture and a technique does not need to generate its own I/Q thereby making multiple techniques very cheap to have in the same architecture. The wideband direct digital synthesizer (DDS) channelizer circuit interprets the frequency function list to create baseband I/Q and select the correct channel as a function of time. Multiple "frequency function lists" can be multiplexed together to allow multiple simultaneous techniques, technique commutation, etc.

Currently in electronic warfare, digital architectures are used to create extremely wideband RF waveforms (100s MHz-Several GHz). Floating Point Gate Arrays (FPGAs) and other digital implementations run fast enough to provide narrowband jamming techniques (up to several 100 MHz) using a direct, single channel, baseband approach. However, to enable wideband techniques where the bandwidth is greater than the data rate of digital logic, a channelizer approach passes a baseband signal through any one of a number of channels.

DDS-based circuits according to an embodiment greatly simplify the transmit architecture for the rest of the transmit chain. A wideband channel translation circuit receives a list of wideband frequencies at which to transmit, and this wideband frequency list is translated into a given channel and the frequency used at that specific channel. The circuits also determine phase modulation and amplitude modulation as well as time commutation. This information is fed to a DDS circuit and finally through a channel de-multiplexor to output the proper waveform, e.g., baseband digital I/Q signals, as a function of time to a digital to analog converter. This allows an entire architecture such that new jamming techniques need only create a parameter, e.g., frequency, list, regardless of the channelized architecture being used. Thus, even if the specific channelizer block changes, e.g., the hardware is upgraded to higher speeds, the techniques stay valid, and only the channel select circuit is updated.

The wideband channel translation circuit translates a frequency list, and amplitude and phase commands into proper channel select and intra-channel DDS commands. The channel de-multiplexor circuit and the intra-channel amplitude and phase amplitude circuits are used to create novel implementations for many known jamming techniques including Chirp, Directed Random Pulse Modulation (DRPM), Random Pulse Modulation (RPM), Random Slope Generation (RSG), Wideband Noise, Subcarriers, and others.

FIG. 1 illustrates a block diagram of a wideband inverse channelization device 100 according to an embodiment. Input metadata 110 is a list of discrete parameters as a function of time defining a waveform's frequency, phase, and amplitude. These parameters may change as often as every digital time step (clock cycle) but only if a change in the parameter value occurs. Frequency data 112 is provided to a frequency generator 114. A bitbasher 118 receives channel selection data 116 and performs slicing, manipulation, concatenation and augmentation of inputs to create selection outputs 120, 122, 124, 126. The operation to be performed by the bitbasher 118 may be implemented using software, such as Verilog. The bitbasher 118 provides the selection outputs 120, 122, 124, 126 at defined ports, wherein the number of ports is equal to the number of expressions. In FIG. 1, the bitbasher 118 provides the outputs 120, 122, 124, 126 as input to a first de-multiplexer 130 and a second de-multiplexer 132 as 4 select bits 190, 192, 194, 196.

Phase data 140 is provided to a phase input 141 of the DDS 142. Sub-frequency data 115 is provided to the DDS 142 at the frequency DDS input 144. The DDS 142 provides baseband digital I/Q signals as a sine wave 146 and a cosine wave 148. The sine wave 146 is provided to a first input 158 of a second multiplier 156. The cosine wave 148 is provided at a first input 152 of a first multiplier 150. Amplitude data 160 is provided to the second input 154 of the first multiplier 150 and the second input 159 of the second multiplier 156. The first multiplier 150 and the second multiplier 156 provide outputs 153, 157 to a data input 190 of the first de-multiplexer 130 and the second de-multiplexer 132, respectively.

Input data metadata 110, i.e., the frequency 112, phase 140 and amplitude 160, are generated and manipulated in the same format regardless of the number of channels. Through operation of the frequency generator 114 and the DDS 142, the input metadata 110 are transformed into dynamic IQ data at the output 170 of the first de-multiplexer 130 and at the output 172 of the second de-multiplexer 132. Thus, a point is used to provide input metadata 110 instead of each technique sending its own raw data. The input metadata 110 scales to N number of channels creating an arbitrarily wide instantaneous bandwidth.

Figure 2:
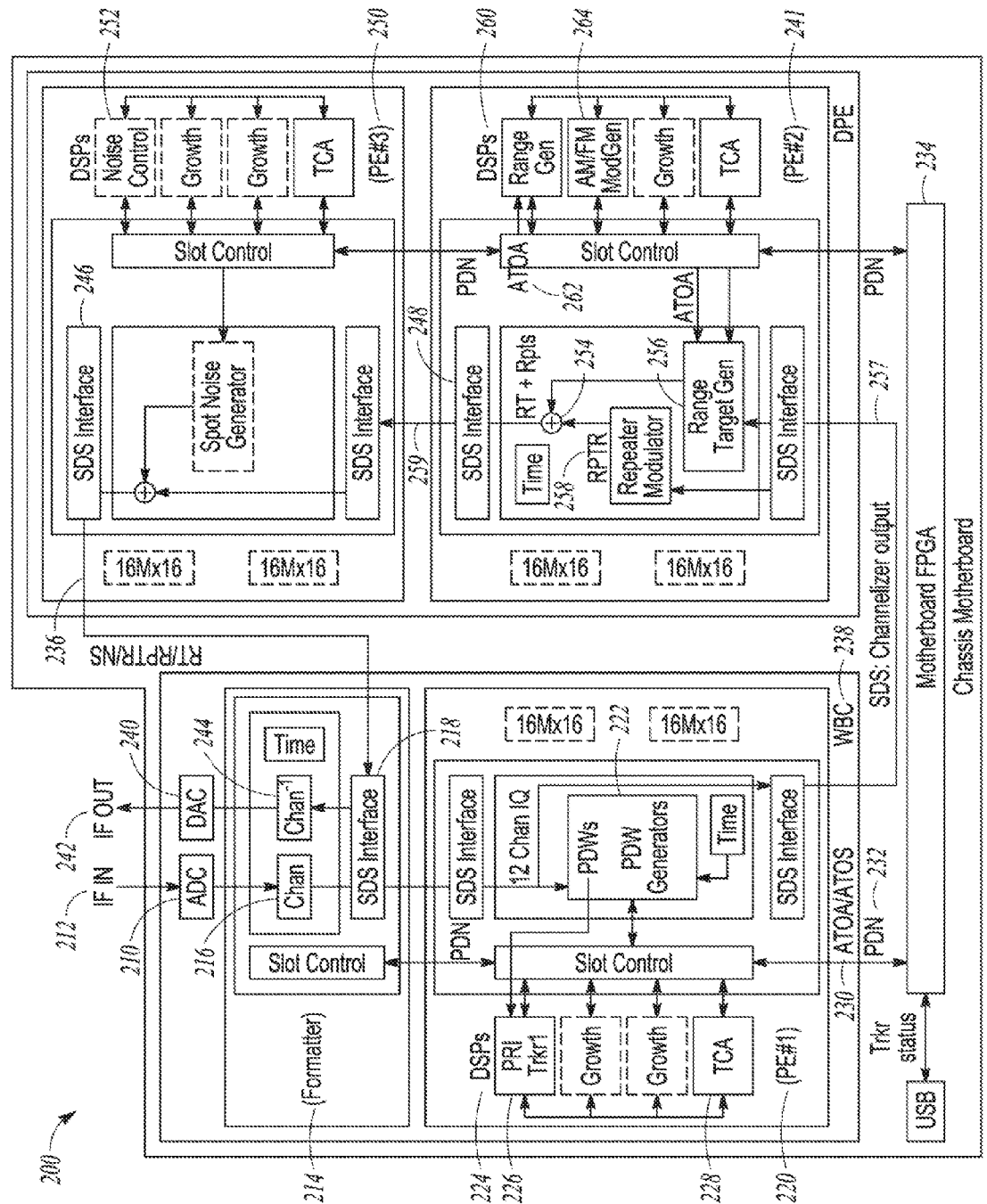
FIG. 2 illustrates a block diagram of a technique generator that uses raw I/Q data.

FIG. 2 illustrates a block diagram of a technique generator 200 that uses raw I/Q data. In FIG. 2, raw I/Q data are sent around the daisy-chain of FPGAs. The raw I/Q data is modified within each FPGA. The data is sent in its final form and sent out of the channelizer. More specifically, an analog-to-digital (ADC) 210 samples input IF 212 from Receiver Exciter (REX) converters (not shown). Formatter FPGA 214 provides a channelizer 216 to channelize ADC data into I/Q channels. A smart distribution system (SDS) 218 transports the middle channels to PE#1 220. At PE#1 220, Pulse Descriptor Word (PDW) generators 222 detect signal energy and extract signal time of arrival (ToA), amplitude, pulse width, frequency, Pulse on Pulse (POP) and apply transmit tags. The PDWs are transported to Digital Signal Processor (DSP) 224 for parameter extraction. The DSP 224 extracts the Pulse Repetition Interval (PRI) 226. The tracker DSP 228 sends Anticipated Time of Arrival/Anticipated Time of Signal (ATOA/ATOS) predictions 230 to Range Target Generator (RTG) via Packet Data Network (PDN) 232. The tracker DSP 228 sends periodic status report to Host PC 234.

The digital-to-analog (DAC) 240 outputs IF energy 242 to the REX up-converters (not shown). The formatter FPGA 214 pads channel input to channels, then an inverse-channelizer 244 separates the channels of the I/Q streams into a DAC. A SDS 246 transports RTG, repeater and noise I/Q data to the formatter FPGA 214 in wideband channel device (WBC) 238. SDS 248 delivers RTG and repeater I/Q data to the noise PE#3 250 where it is summed with noise technique waveforms by noise control DSP 252.

A combiner 254 in PE#2 241 sums the RTG 256 with repeat channels 258 and the RTG DSP 260 uses ATOA and ATOS updates 262 to update the target offset commands. The AM/FM DSP 264 updates target modulation rates and applies the modulations to each target. Thus, in FIG. 2, raw I/Q data 257, 259, 236 is sent around the daisy-chain of FPGAs. Moreover, the raw I/Q data is modified within each of the FPGAs, i.e., 220, 241, 250.

Figure 3:
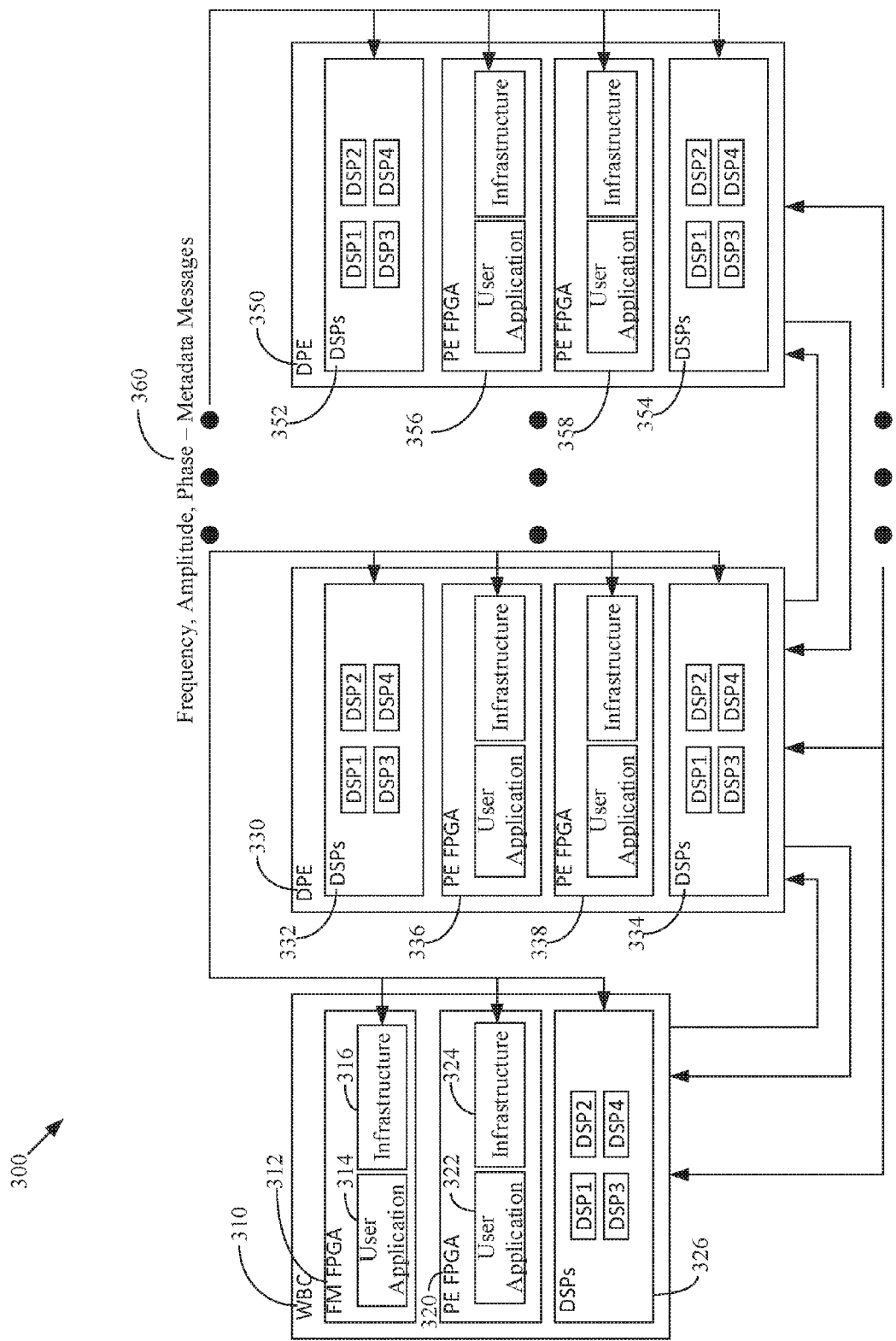
FIG. 3 is a block diagram of a technique generator according to an embodiment.

FIG. 3 is a block diagram of a technique generator 300 according to an embodiment. As shown in FIG. 3, independent module application blocks are used, not a data flow daisy chain. The wideband channel device (WBC) 310 includes an FM FPGA 312 having a user application 314 and infrastructure module 316 for providing linkable behavioral modules. A PE FPGA 320 also includes a user application 322 and infrastructure module 324. A DSP 326 device provides processing for controlling and managing the processes involved in the technique generations. DPEs 330, 350 each include two DSP blocks 332, 334 and 352, 354, as well as two PE FPGAs 336, 338 and 356, 358. The number of DPEs 330, 350 may be scaled to support the generation of any techniques that may be requested. The metadata circuits depicted in previous figures allows scalability up to an arbitrary number of techniques, an embodiment of this scaling shown here. Further, FIG. 3 shows that small metadata messages 360 are used rather than large streaming raw data. The metadata 360 gets reconstructed as shown in FIG. 4.

Figure 4:
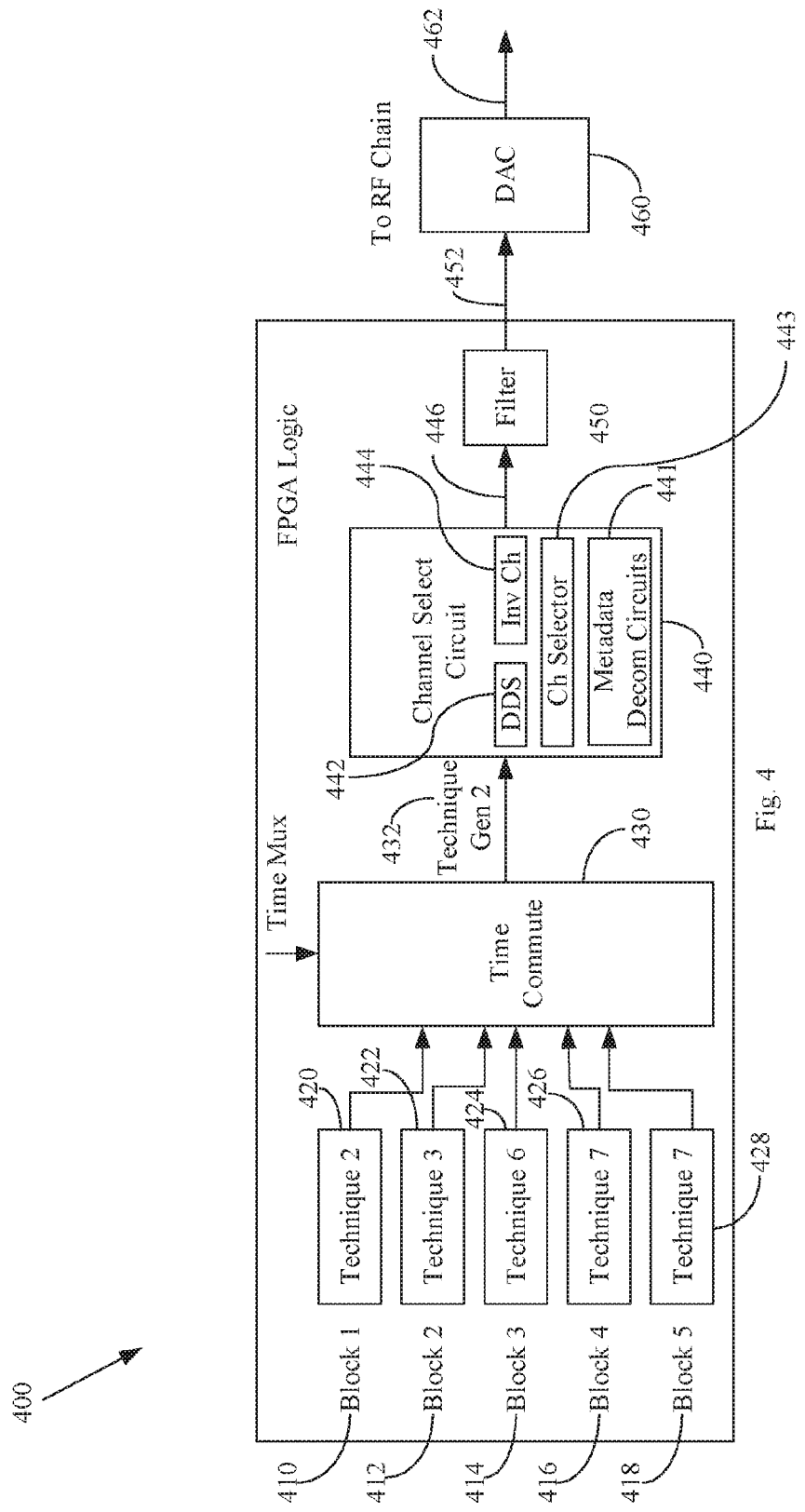
FIG. 4 illustrates the metadata of a plurality of techniques time commutated to create time commutation of radio waveforms according to an embodiment.

FIG. 4 illustrates the high level digital architecture 400 that performs time commutation according to an embodiment. Technique 2 420 is available in block 1 410. Two copies of technique 7 426, 428 are provided in block 4 416 and block 4 418. Technique 3 422 is available in block 2 412 and technique 6 424 is available in block 3 414. The control processor may want to send out the two technique 7 426, 428 on two different channels simultaneously or time commute between two different sets of parameters on the two technique 7 426, 428. Techniques may be commutated at time commute multiplexer 430 and their frequency list values 432 are selected to send to the channel select circuit 440. The channel select circuit 440 includes metadata decomposition circuits 441, the direct digital synthesizer (DDS) 442, the channel selector 443, and inverse channelizer 444 circuits. The time commutation at time commute multiplexer 430 scales as the number of channels increases.

The meta data from the technique generators 432 is passed into the channel select circuit 440, where the direct digital synthesizer (DDS) 442 creates the I/Q data for the intended waveform at the data rate of a single channel, the data is then put into the correct channel in the inverse channelizer 444, and the data is then output as a single wideband I/Q stream 446. This allows the DDS 442 to output data at a limited data rate of standard digital logic; for example, at 78 MHz, the data rate supported by the preferred embodiment of an FPGA. The wideband I/Q stream 446 is passed through filter 450. For an efficient technique architecture, which creates the waveforms to be transmitted, jamming technique applications need not be aware of the channelized architecture. A frequency list is sent to the channel select circuit 440. The filtered outputs 452 are converted to analog RF signals 462 at DAC 460

Figure 5:
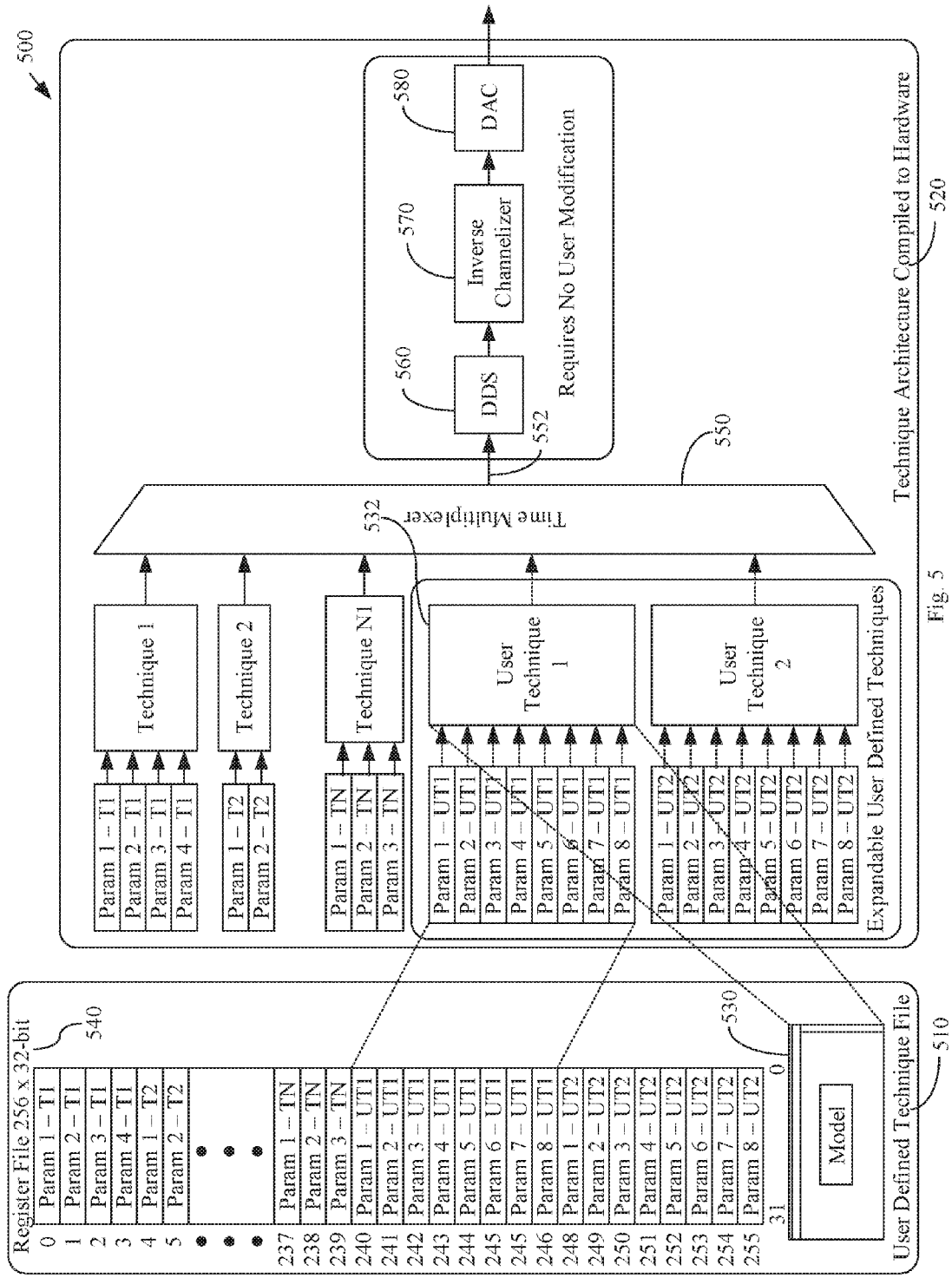
FIG. 5 illustrates a built-in modular architecture for swapping in new technique according to an embodiment.

FIG. 5 illustrates a built-in modular architecture 500 for swapping in new techniques according to an embodiment. In FIG. 5, user defined technique files 510 are provided to a technique architecture 520 for compiling to hardware. Models 530 that are created by the user may be used to generate user techniques, e.g., user technique 1 532. Parameters are provided to the techniques from a control processor or from memory from a register file 540 are also provided to the technique architecture 520 for generating different types of waveforms from a single technique block. The techniques are multiplexed at a time multiplexer 550. The multiplexed techniques 552 are provided as input to DDS 560. The DDS 560 proves output signals to an inverse channelizer 570, which are then provided to DAC 580.

Figure 6:
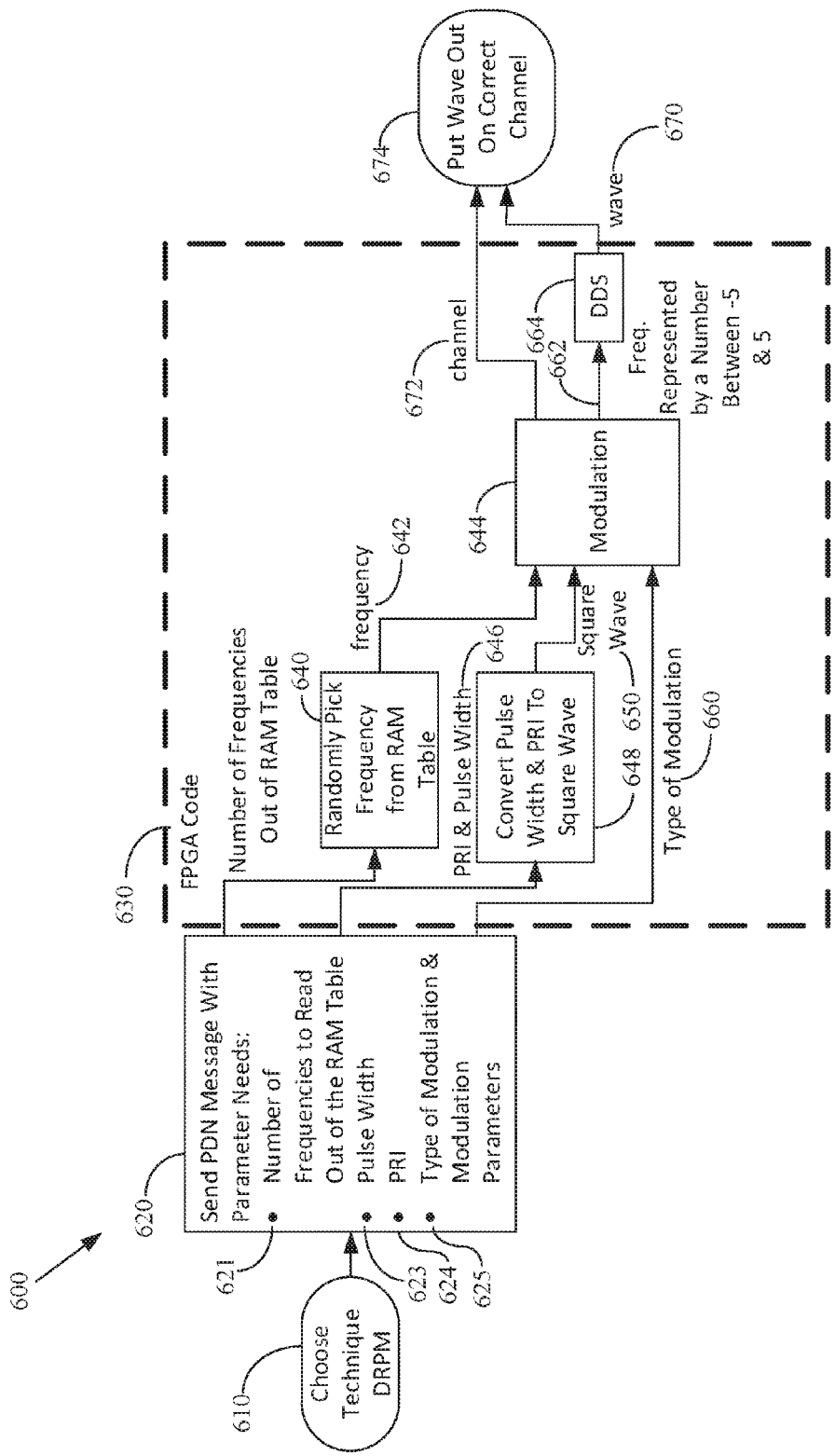
FIG. 6 illustrates a an example of radio waveform technique's metadata being sent to a channelized direct digital synthesizer (DDS) circuit according to an embodiment.

FIG. 6 illustrates a built-in modular architecture 600 for swapping in new technique according to an embodiment. In FIG. 6, user defined technique files 610 are provided to a technique architecture 620 for compiling to hardware. The technique architecture 620 includes one or more modules to which a PDN message with several parameters are sent to generate the waveform. The parameters include the number of frequencies to read out of the RAM table/register file 621, the pulse width 623, the PRI 624 and the type of modulation and modulation parameters 625. Models 630 that are created by the user may be used to generate user techniques, e.g., user technique 1 632 532 shown in FIG. 5. Parameters are provided to the techniques from a control processor or from memory from a register file 640 are also provided to the technique architecture 620 for generating different types of waveforms from a single technique block. The pulse width 623 and PRI 624 are provided to a module 646 to generate a square wave 650, which, along with the type of modulation 660 and frequency 642 are supplied to a modulation block 644. The techniques are multiplexed in the modulation block 644 at a time multiplexer 650 550 shown in FIG. 5. The multiplexed techniques 662 are provided as input to DDS 664. The DDS 664 proves output signals to an inverse channelizer 570 shown in FIG. 5, which are then provided to DAC 580 shown in FIG. 5 as an output wave 670. The modulation block 644 also provide the desired channel information 672 which is used with the output wave 670 to provide the wave on the correct channel 674.

FIGS. 7-9 illustrates a circuit that allows only half of the channels used to be instantiated in the inverse channelizer portion for a given clock cycle, effectively allowing channel resources to be shared, according to an embodiment. This circuit allows only the even channels of an inverse channelizer or only the odd channels of the inverse channelizer to be instantiated in hardware on a given clock cycle, thus cutting required hardware resources for the inverse channelizer in half. FIG. 7 illustrates an infrastructure 700 for chirp modulated signals to share a channel according to an embodiment. A signal selector 710 provides a signal to a first chirp frequency generator for channel 1712, to a select input 721 of multiplexer 20 that selects between the generated chirp frequency for channel 1718 and the chirp frequency for channel 2 719, to a channel selection input 732 of a DDS 730 and to a logical inverter 716 for enabling the chirp frequency generator for channel 2714 when appropriately biased. Thus, the selection signal 710 provides the chirp frequency generator for channel 1712 or the chirp frequency generator for channel 2714 to be provided as an output. The DDS 730 receives a chirp frequency 734 according to the channel selection signal 732. A chirp modulated signal is generated for channel 1 and for channel 2736 for output port 739, and which can be verified at scope 740. The output phase 738 is processed through delay circuits 741, 742, which are fed back to the DDS 730 as an input phase signal 737.

FIG. 8 illustrates a modified infrastructure 800 for sharing channel resources according to an embodiment. The modified infrastructure 800 allows the hardware resources of N/2 channels to be used to instantiate an N-channel channelizer. In FIG. 8, a first chirp frequency generator used for channel 1 810 provides a signal to a first DDS 820. A second chirp frequency generator is used for channel 2 812 and is provided to a second DDS 822. Thus, instead of multiplexing between the first and second chirp frequency generators 810, 812, the modified infrastructure 800 of FIG. 8 uses two separate DDSs 820, 822. The chirp modulated signal output signal 821 of the first DDS 820 is up-sampled 830 and provided to an adder 840. The chirp modulated signal output chirp modulated signal 823 of the second DDS 822 is processed through a delay circuit 850 and then up-sampled 860. The delayed and up-sampled output 862 is also provided to the adder 840. The combined chirp modulated signal 842 is then provided at the output 844. Again, the output 844 may be measured and/or verified at scope 845.

FIG. 9 illustrates a modified infrastructure 900 that uses a channel combiner to allow channel resources to be shared according to an embodiment. In FIG. 9, a first chirp frequency generator used for channel 1 910 again provides a signal to a first DDS 920. A second chirp frequency generator is used for channel 2 912 and is provided to a second DDS 922. The chirp modulated signal output signal 921 of the first DDS 920 is provided to the channel 1 output 930. The chirp modulated signal output signal 923 of the second DDS 922 is provided to the channel 2 output 940. The channel 1 output 930 and the channel 2 output 940 are provided to channel combiner 950 at even channel input 952 and odd channel input 954, respectively. In FIG. 9, the channel combiner 950 thus combines the chirp modulated signal for channel 1 and the chirp modulated signal for channel 2 as combined chirp modulated signal 956, which may be verified at scope 955.

Figure 10:
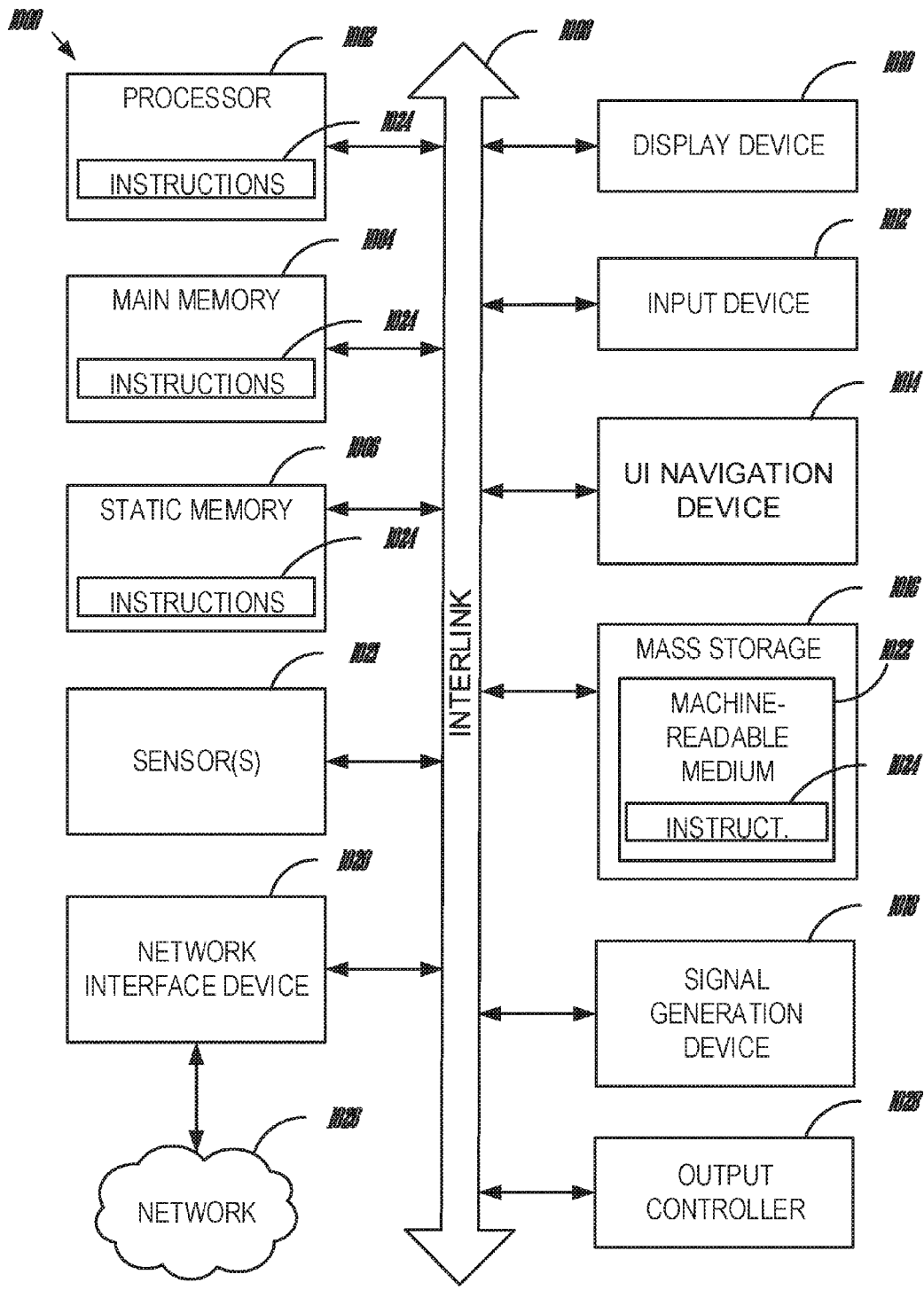
FIG. 10 illustrates a block diagram of an example machine for providing runtime creation, assignment, deployment and updating of arbitrary radio jamming techniques for a jamming device according to an embodiment.

FIG. 10 illustrates a block diagram of an example machine 1000 for providing efficient wideband inverse channelization for direct digital synthesizer based jamming techniques according to an embodiment upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine and/or a client machine in server-client network environments. In an example, the machine 1000 may act as a peer machine in peer-to-peer (P2P) (or other distributed) network environment. The machine 1000 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term application, or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with others via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The storage device 1016 may include at least one machine readable medium 1022 on which is stored one or more sets of data structures or instructions 1024 (e.g., software) embodying or utilized by any one or more of the techniques or functions described herein. The instructions 1024 may also reside, at least partially, additional machine readable memories such as main memory 1004, static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for providing wideband inverse channelization for direct digital synthesizer based jamming, comprising:
   selecting metadata of at least one of a plurality of jamming techniques using a time commute multiplexer, the plurality of jamming techniques comprising different metadata associated with jamming for generating a waveform, the selected metadata comprising frequency, phase and amplitude parameters and free from raw data specific to the at least one of a plurality of jamming techniques;
   generating a reference frequency at a frequency generator based on the frequency parameter;
   generating data select signals and data input based on the selected metadata and the reference frequency;
   providing the data select signals and data input to a first de-multiplexer and a second de-multiplexer; and
   producing in-phase and quadrature signals at an output of the first de-multiplexer and the second de-multiplexer, respectively, based on the data select signals and the data input.

2. The method of claim 1, wherein the generating the data select signals and the data input based on the selected metadata further comprises:
   generating a control signal at the frequency generator;
   receiving the control signal at a bitbasher; and
   processing the control signal to produce the data select signals at an output of the bitbasher, by performing slicing, manipulation, concatenation and augmentation of the control signal at the bitbasher.

3. The method of claim 1, wherein the generating the data select signals and the data input based on the selected metadata further comprises:
   receiving the reference frequency at a direct digital synthesizer;
   receiving the phase parameter at the direct digital synthesizer; and
   generating, based on the received phase parameter and the received reference frequency, a sine wave and a cosine wave at an output of the direct digital synthesizer.

4. The method of claim 3, wherein the generating the data select signals and the data input based on the selected metadata further comprises:
   providing the sine wave as a first input to a first multiplier;
   providing the cosine wave as a first input to a second multiplier;
   receiving, at a second input at the first multiplier and at a second input at the second multiplier, the amplitude parameter; and
   producing, at a first output at the first multiplier and at a first output of the second multiplier, the data input to the first and second de-multiplexer, respectively.

5. A programmable device, comprising:
   a time commute multiplexer arranged to select metadata of at least one of a plurality of jamming techniques, the plurality of jamming techniques comprising different metadata for generating a waveform, the metadata comprising frequency, phase and amplitude parameters;
   a frequency generator arranged to receive the metadata and generate a reference frequency based on the frequency parameter, a data input generated based on the received metadata and the reference frequency;
   a first de-multiplexer, coupled to the frequency generator, the first de-multiplexer arranged to receive the data select signals and data input; and
   a second de-multiplexer, coupled to the frequency generator, the second de-multiplexer arranged to receive the data select signals and data input;
   wherein the first de-multiplexer and the second de-multiplexer are arranged to produce in-phase and quadrature signals at an output of the first de-multiplexer and the second de-multiplexer, respectively, based on the data select signals and the data input.

6. The programmable device of claim 5 further comprising a bitbasher, wherein the frequency generator is arranged to produce a control signal based on the frequency parameter, and wherein the bitbasher is arranged to produce data select signals at an output by performing slicing, manipulation, concatenation and augmentation of the control signal.

7. The programmable device of claim 5 further comprising a direct digital synthesizer, wherein the direct digital synthesizer is arranged to receive the reference frequency from the frequency generator and a phase parameter, the direct digital synthesizer is further arranged to generate a sine wave and a cosine wave based on the phase parameter and the received reference frequency.

8. The programmable device of claim 7, wherein the generation of the data select signals and the data input based on the received metadata further comprises:
   providing to a first multiplier the sine wave at a first input and the amplitude parameter at a second input; and
   providing to a second multiplier the cosine wave at a first input and the amplitude parameter at a second input,
   wherein, based on the frequency, phase and amplitude parameter, the first multiplier is arranged to produce a first data input to the first de-multiplexer, and wherein the second multiplier is arranged to produce a second data input to the second de-multiplexer.

9. At least one non-transitory machine readable medium comprising instructions that, when executed by the machine, cause the machine to perform operations for providing wideband inverse channelization for direct digital synthesizer based jamming, the operations comprising:
   selecting metadata of at least one of a plurality of jamming techniques using a time commute multiplexer, the plurality of jamming techniques comprising different metadata associated with jamming for generating a waveform, the selected metadata comprising frequency, phase and amplitude parameters and free from raw data specific to the at least one of a plurality of jamming techniques;
   generating a reference frequency based on the frequency parameter;
   generating data select signals and data input based on the selected metadata and the reference frequency;
   providing the data select signals and data input to a first de-multiplexer and a second de-multiplexer; and
   producing in-phase and quadrature signals at an output of the first de-multiplexer and the second de-multiplexer, respectively, based on the data select signals and the data input.

* * * * *